(12) United States Patent
Lange et al.

(10) Patent No.: US 6,780,360 B2
(45) Date of Patent: Aug. 24, 2004

(54) METHOD OF FORMING A PTFE INSULATION LAYER OVER A METALLIC CONDUCTOR AND PRODUCT DERIVED THEREFORM

(75) Inventors: William H. Lange, Southington, CT (US); Edward J. Pallarti, Hamden, CT (US)

(73) Assignee: Times Microwave Systems, Wallingford, CT (US)

( * ) Notice: Subject to any disclaimer, the term of this patent is extended or adjusted under 35 U.S.C. 154(b) by 409 days.

(21) Appl. No.: 09/990,961

(22) Filed: Nov. 21, 2001

(65) Prior Publication Data

US 2003/0094727 A1 May 22, 2003

(51) Int. Cl.$^7$ .............................................. B29C 47/88
(52) U.S. Cl. ............ 264/127; 264/171.14; 264/331.11; 264/331.14
(58) Field of Search .......................... 264/171.14, 127, 264/126, 173.16, 173.19, 331.1, 331.14; 428/411.11

(56) References Cited

U.S. PATENT DOCUMENTS

| | | | |
|---|---|---|---|
| 3,616,177 A | 10/1971 | Gumerman | 161/165 |
| 4,000,348 A * | 12/1976 | Harlow | 428/422 |
| 4,273,829 A | 6/1981 | Perreault | 428/383 |
| 4,304,713 A | 12/1981 | Perelman | 264/45.9 |
| 4,382,236 A * | 5/1983 | Suzuki | 333/1 |
| 4,443,657 A * | 4/1984 | Hill et al. | 174/110 FC |
| 4,626,810 A * | 12/1986 | Nixon | 333/243 |
| 4,801,501 A | 1/1989 | Harlow | 428/383 |
| 4,987,274 A * | 1/1991 | Miller et al. | 174/102 R |
| 5,059,263 A | 10/1991 | Sahakian | 156/56 |
| 5,110,998 A | 5/1992 | Muschiatti | 174/24 |
| 5,210,377 A | 5/1993 | Kennedy | 174/107 |
| 5,227,103 A | 7/1993 | Muschiatti | 264/45.9 |
| 5,245,134 A * | 9/1993 | Vana et al. | 174/117 F |
| 5,262,589 A * | 11/1993 | Kesler | 174/36 |
| 5,281,766 A | 1/1994 | Hildreth | 174/120 R |
| 5,286,924 A * | 2/1994 | Loder et al. | 174/117 F |
| 5,306,869 A * | 4/1994 | Springer et al. | 174/36 |
| 5,393,929 A | 2/1995 | Yagihashi | 174/36 |
| 5,397,855 A | 3/1995 | Ferlier | 174/36 |
| 5,426,264 A | 6/1995 | Livingston | 174/102 R |
| 5,477,011 A | 12/1995 | Singles | 174/102 R |
| 5,527,612 A | 6/1996 | Ohta | 428/379 |
| 5,554,236 A | 9/1996 | Singles | 156/52 |
| 5,576,515 A | 11/1996 | Bleich | 174/110 PM |
| 5,614,319 A | 3/1997 | Wessels | 428/379 |
| 5,750,931 A | 5/1998 | McGregor | 174/110 PM |
| 5,770,819 A | 6/1998 | Mehan | 174/110 PM |
| 5,814,406 A | 9/1998 | Newmoyer | 428/379 |
| 5,904,978 A | 5/1999 | Hanrahan | 428/313.5 |
| 5,922,155 A | 7/1999 | Clouet | 156/51 |
| 6,064,008 A | 5/2000 | Craton | 174/110 FC |
| 6,103,031 A | 8/2000 | Aeschbacher | 156/54 |
| 6,139,957 A | 10/2000 | Craton | 428/379 |
| 6,231,919 B1 | 5/2001 | Craton | 427/119 |
| 6,267,834 B1 * | 7/2001 | Shannon et al. | 156/84 |

* cited by examiner

*Primary Examiner*—Mark Eashoo
(74) *Attorney, Agent, or Firm*—McCormick, Paulding & Huber LLP

(57) ABSTRACT

A method of forming a polytetraflouroethylene (PTFE) insulation layer over a metallic conductor of a processed product includes the steps of extruding PTFE over a metallic conductor, and heating the PTFE to a temperature substantially below that of the sintering temperature of PTFE to form a sintered PTFE skin over an unsintered PTFE core.

25 Claims, 1 Drawing Sheet

METHOD OF FORMING A PTFE INSULATION LAYER OVER A METALLIC CONDUCTOR AND PRODUCT DERIVED THEREFORM

FIELD OF THE INVENTION

This invention relates generally to a method of fabricating an insulated conductor, and more particularly to a method of extruding over a metallic conductor a low loss, unsintered polytetraflouroethylene (PTFE) dielectric core surrounded by a sintered PTFE skin.

BACKGROUND OF THE INVENTION

Polytetraflouroethylene (PTFE) is typically used as an electrical insulator over metallic conductors in the form of coaxial cables or other types of electrical conductors. PTFE has an extremely high melt viscosity. Consequently, PTFE cannot typically be melt processed. Instead, the PTFE to be processed is typically a fine powder. The powder is mixed with a processing or extruding aid of about 15% to 20% by weight relative to the PTFE. The extruding aid is typically an oil such as, for example, Naphtha. For wire applications, the resulting slurry is then forced by paste extrusion onto and to thereupon coat a conductor. This product is then processed through a vaporizing oven at about 450° F. to vaporize the extruding aid out of the PTFE. The product is then further processed through a sintering oven wherein the PTFE is heated above its sintering point of about 700° F. When the product exits the sintering oven, the fully sintered PTFE congeals into a solid, homogenous mass. The paste extrusion, vaporizing oven and sintering oven are usually implemented in one continuous process to treat the product. The material is pulled through this process by conventional wire and cable equipment. The velocity of propagation ($V_P$) of the resulting product is about 70% of the speed of light.

During the above-described process, there are typically required several pieces of equipment to pull the coated conductor. The equipment pieces exert their pulling force on the paste extruded PTFE. The PTFE is fully sintered, and unfortunately has a larger attenuation at high operating frequencies of, for example 18 GHz or higher, as compared to unsintered PTFE.

It is a general object of the present invention to provide a method of extruding PTFE over a metallic conductor and product derived therefrom that avoids the above-mentioned drawbacks.

SUMMARY OF THE INVENTION

In a first aspect of the present invention, a method of forming a dielectric insulation layer over a metallic conductor of a processed product includes the steps of extruding a generally non-melt processable dielectric such as, for example, polytetrafluoroethylene (PTFE) over a metallic conductor, and heating the dielectric to a temperature substantially below that of the sintering temperature of the dielectric so as to form a sintered dielectric skin over an unsintered dielectric core.

In a second aspect of the present invention, a method of forming a polytetrafluoroethylene (PTFE) insulation layer over a metallic conductor of a processed product includes the steps of extruding PTFE with an extruding aid over a metallic conductor. The extruding aid is vaporized out of the PTFE. The PTFE is heated to a temperature substantially below that of the sintering temperature of PTFE so as to form a sintered PTFE skin over an unsintered PTFE core.

In a third aspect of the present invention, a method of forming a PTFE insulation layer over a metallic conductor of a processed product includes the steps of conveying the processed product at a generally constant speed during a fabrication process. The process includes extruding PTFE with an extruding aid through a die and over a metallic conductor. The extruding aid is vaporized out of the PTFE at a temperature of about 450° F. The PTFE is heated to a temperature of about 500° F. so as to form a sintered PTFE skin over an unsintered PTFE core.

An advantage of the present invention is that the fabrication process is accomplished at generally the same speed throughout the process.

A second advantage is that a low loss, unsintered PTFE skin is formed compared to a fully sintered PTFE layer.

Other advantages will be made apparent with reference to the description and accompanying drawings.

DETAILED DESCRIPTION OF THE PREFERRED EMBODIMENT

Figure 1:
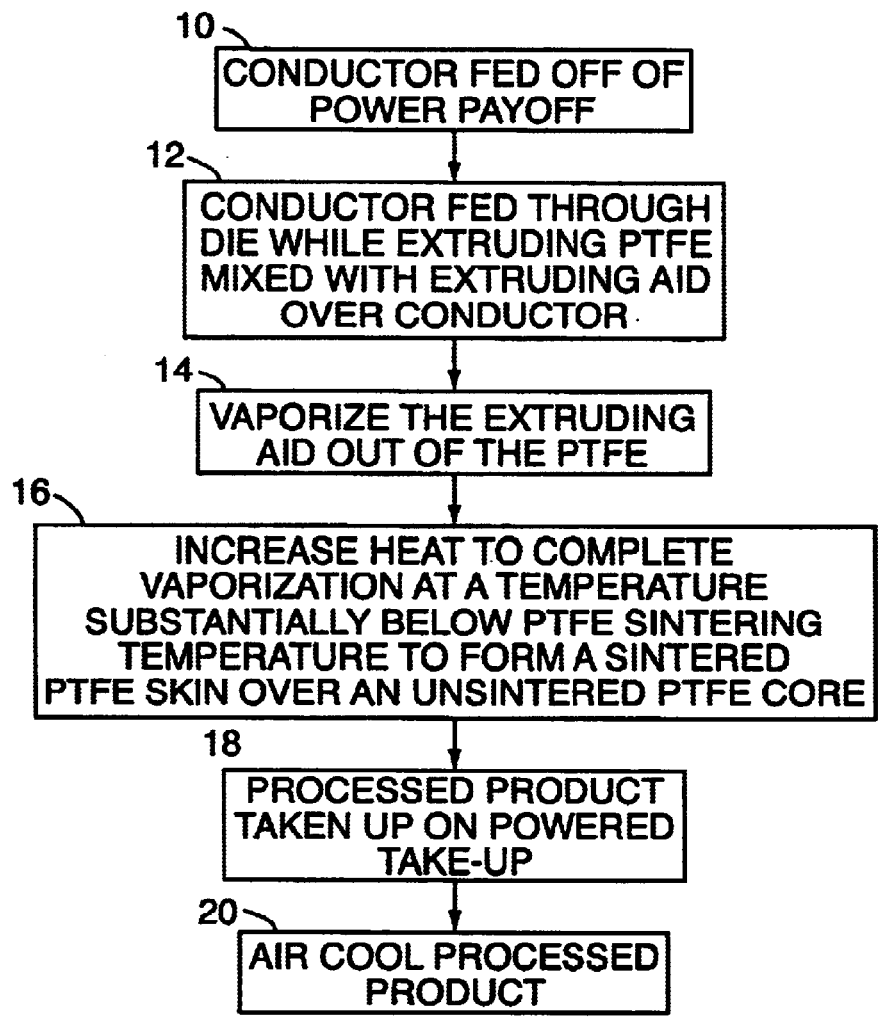
FIG. 1 is a flow diagram of a process for forming a PTFE insulation layer over a metallic conductor to form a processed product according to an embodiment of the present invention.

With reference to FIG. 1, an embodiment of a process for forming a polytetrafluoroethylene (PTFE) insulation layer over a metallic conductor to form a processed product in accordance with the present invention is illustrated by the flow diagram of FIG. 1. Although a PTFE insulation layer is used in the embodiment, it should be understood that other dielectrics such as for example, generally non-melt processable thermoplastic materials may be used without departing from the scope of the present invention.

A metallic conductor to be treated with a PTFE insulation layer is fed off of a power payoff (step 10) and along a conveyor system. The conductor is fed through a die associated with an extruder while PTFE mixed with an extruding aid or lubricant, for example, a petroleum solvent such as VMP Naphtha, is extruded over the conductor (step 12). The processed product is heated to a temperature of, for example about 450° F. in one or more vapor ovens or zones to vaporize the extruding aid out of the PTFE (step 14). The processed product is then subjected in one or more sinter ovens or zones having an increased temperature relative to the vaporizing temperature for forming a sintered PTFE skin over an unsintered PTFE core (step 16). The temperature is substantially below that of a PTFE sintering temperature so as to form non-homogenous areas and interdispersed voids throughout the PTFE layer. These voids create a high velocity of propagation at values of, for example, about 76.5% of the speed of light. As an example, the processed product is exposed to a temperature of about 500° F., whereas the temperature for fully sintering the PTFE is typically about 700° F. The processed product is taken up on a powered take-up spool (step 18) and is air cooled (step 20).

More specifically with respect to the skin forming step 16, unsintered PTFE has a lower loss tangent than fully sintered PTFE by at least a magnitude. This is an advantage at frequencies of, for example, 18 GHz and above because the attenuation contribution from the dielectric PTFE becomes significant at high frequencies. In other words, unsintered dielectric has significantly better attenuation properties than sintered at high frequencies. Heating the PTFE to a temperature substantially below that of its sintering temperature provides a minimum skin or sintered portion on the outside edge of and surrounding an unsintered core of the PTFE. The unsintered core thus provides low attenuation at high frequencies.

The skin provides the physical integrity to hold the dielectric core together. For example, the slight sintering prevents separation of the unsintered PTFE fibers. Without this the dielectric could split along the axis of the cable. The amount of sintering on the outside of the dielectric is minimized since any portion of the dielectric that is sintered adds to the overall attenuation of the cable.

Figure 2:
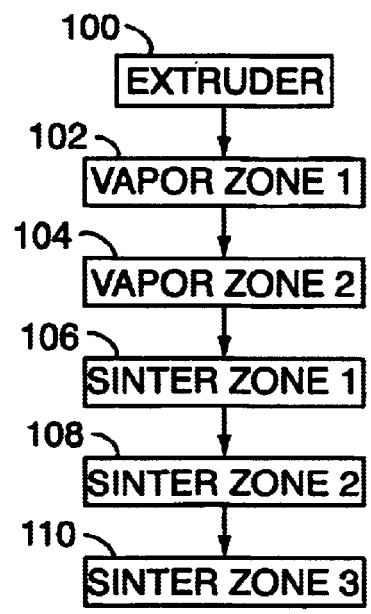
FIG. 2 schematically illustrates an example of equipment employed for forming the processed product according to the present invention.

FIG. 2 schematically illustrates an example of processing equipment for carrying out the method of forming a PTFE insulation layer over a metallic conductor in accordance with the present invention. An extruder 100 includes a die for shaping the PTFE insulation layer as it is extruded over the metallic conductor. The processed product is conveyed at a generally constant speed through first and second vapor ovens or zones 102 and 104 for vaporizing the VMP Naphtha out of the PTFE. The processed product continues to be conveyed at a generally constant speed through the first, second and third sinter ovens or zones 106, 108 and 110 to form a sintered PTFE skin over an unsintered PTFE core, and such that non-homogenous areas of PTFE are formed with interdispersed voids. Although two vapor ovens and three sinter ovens are shown, a different number of vapor ovens and sinter ovens may be employed without departing from the scope of the present invention.

A more specific processing example will now be explained. A conductor is fed off of a power payoff with a dancer set at 15 psig for line tension. PTFE such as, for example, CFP 6000 Grade PTFE manufactured by DuPont mixed with an extruding aid such as VMP Naphtha ranging from 16% to 20% by weight is extruded onto 0.034" diameter center conductor (drawn to size). A 0.038" guider tip is employed to pull a center conductor through a 0.090" die with a 0.287" land length. The finished PTFE core extrusion size is expanded out from 0.090" die diameter to about 0.096" diameter prior to entering the first vapor oven 102. The first and second vapor ovens 102, 104 vaporize the VMP Naphtha out of the PTFE. The three sinter ovens 106, 108, 110 complete vaporization. Additionally, a 0.003" to 0.005" PTFE skin forms on the outside edge of the unsintered PTFE core. After exiting the third sinter oven 110, the PTFE shrinks to approximately 0.092" to 0.094". The material is taken-up on a powered take-up spool. The core is further air-cooled and shrinks to its final size. The resultant PTFE layer has a sintered skin surrounding an unsintered core, and has a velocity of propagation of about 76% of the speed of light. Diameter gauging during processing may be done with electronic Lasermike gauges. The processing speed is generally constant throughout the process and is approximately 14 feet/minute. The two vapor zones 102, 104 are set to 450° F., and the three sinter zones 106, 108, 110 are set to 500° F. The reduction ratio is about 1230:1.

The residence time in the ovens is about 4.4 minutes. This length of time is based on a sixty-two feet length of the ovens for the 14 feet/minute processing speed. Employing different oven lengths results in adjusting the processing speed to achieve approximately the same residence time (and thus the thermal history that the coaxial core experiences). Different core sizes, however, (i.e., either the conductor and/or the overall PTFE thickness) results in different total thermal history requirements, and consequently results in different residence times for a particular oven length.

Although the invention has been shown and described above, it should be understood that numerous modifications can be made without departing from the spirit and scope of the present invention. Accordingly, the present invention has been shown and described by way of illustration rather than limitation.

What is claimed is:

1. A method of forming a dielectric insulation layer over a metallic conductor of a processed product, comprising the steps of:
    a) extruding a dielectric layer over a metallic conductor; and
    b) heating dielectric layer to a temperature of about 500° F. to form a sintered dielectric skin over an unsintered dielectric core.

2. A method as defined in claim 1, wherein the dielectric is a generally non-melt processable thermoplastic.

3. A method as defined in claim 1, wherein the dielectric is polytetraflouroethylene (PTFE).

4. A method as defined in claim 3, wherein the step of extruding includes extruding PTFE with an extruding aid.

5. A method as defined in claim 4, wherein the extruding aid is a petroleum solvent.

6. A method as defined in claim 5, wherein the petroleum solvent is VMP Naphtha.

7. A method as defined in claim 6, wherein the VMP Naphtha is present at about 16% to about 20% by weight relative to PTFE.

8. A method as defined in claim 4, further including after step a) the step of vaporizing the extruding aid out of the PTFE.

9. A method as defined in claim 8, wherein the temperature for vaporizing the extruding aid is about 450° F.

10. A method as defined in claim 8, wherein the step of vaporizing includes moving the processed product through at least one vaporizing zone.

11. A method as defined in claim 8, wherein the step of vaporizing includes moving the processed product at about 14 feet/minute through at least one vaporizing zone.

12. A method as defined in claim 3, wherein the step of heating includes moving the processed product through at least one sintering zone for incomplete sintering of the PTFE.

13. A method as defined in claim 3, wherein the step of heating includes moving the processed product at about 14 feet/minute through at least one sintering zone.

14. A method as defined in claim 3, wherein the PTFE skin is about 0.003 inches to about 0.005 inches in thickness.

15. A method as defined in claim 3, wherein the PTFE core is about 0.092 to about 0.094 inches in thickness.

16. A method of forming a polytertraflouroethylene (PTFE) insulation layer over a metallic conductor of a processed product, comprising the steps of:
    extruding a PTFE layer with an extruding aid over a metallic conductor;
    vaporizing the extruding aid out of the PTFE; and
    heating the PTFE layer to a temperature of about 500° F. to form a sintered PTFE skin over an unsintered PTFE core.

17. A method as defined in claim 16, wherein the step of vaporizing includes vaporizing the extruding aid out of the PTFE at a temperature of about 450° F.

18. A method as defined in claim 16, further including the step of conveying the processed product at a generally constant speed through at least one vaporizing zone and at least one heating zone during the steps of vaporizing and heating, respectively.

19. A method as defined in claim 18, wherein the step of conveying includes conveying the processed product at about 14 feet/minute.

20. A method as defined in claim 16, wherein the PTFE skin is about 0.003 inches to about 0.005 inches in thickness.

21. A method as defined in claim 16, wherein the PTFE core is about 0.092 to about 0.094 inches in thickness.

22. A method of forming a polytetraflouroethylene (PTFE) insulation layer over a metallic conductor of a processed product, comprising the steps of:

conveying the processed product at a generally constant speed during a fabrication process that includes:

extruding PTFE with an extruding aid through a die and over a metallic conductor;

vaporizing the extruding aid out of the PTFE at a temperature of about 450° F.; and heating the PTFE to a temperature of about 500° F. to form a sintered PTFE skin over an unsintered PTFE core.

23. A method as defined in claim 22, wherein the step of conveying includes conveying the processed product at a speed of about 14 feet/minute.

24. A method as defined in claim 22, wherein the PTFE skin is about 0.003 inches to about 0.005 inches in thickness.

25. A method as defined in claim 22, wherein the PTFE core is about 0.092 to about 0.094 inches in thickness.

* * * * *

UNITED STATES PATENT AND TRADEMARK OFFICE
CERTIFICATE OF CORRECTION

PATENT NO.    : 6,780,360 B2
DATED         : August 24, 2004
INVENTOR(S)   : William H. Lange and Edward J. Pallanti It is certified that error appears in the above-identified patent and that said Letters Patent is hereby corrected as shown below:

<u>Title page,</u>
Item [54], Title, should read as follows:
-- METHOD OF FORMING A PTFE INSULATION LAYER OVER A METALLIC CONDUCTOR AND PRODUCT DERIVED THEREFROM --
Item [75], Inventors, second inventor's name should read as follows:
-- Edward J. Pallanti --

Signed and Sealed this

Fourteenth Day of December, 2004

JON W. DUDAS
*Director of the United States Patent and Trademark Office*